Figure 5:
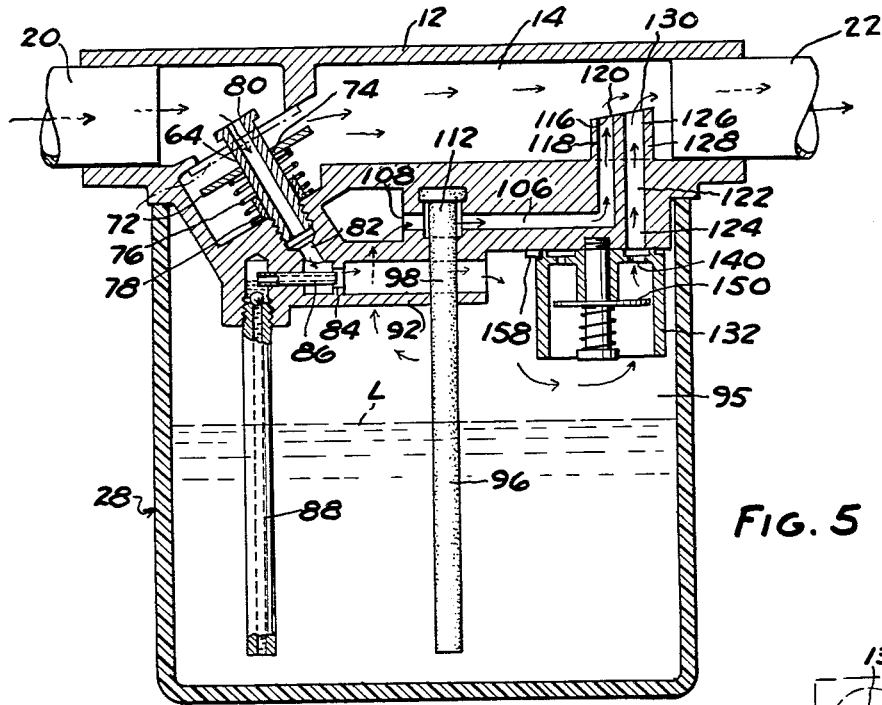

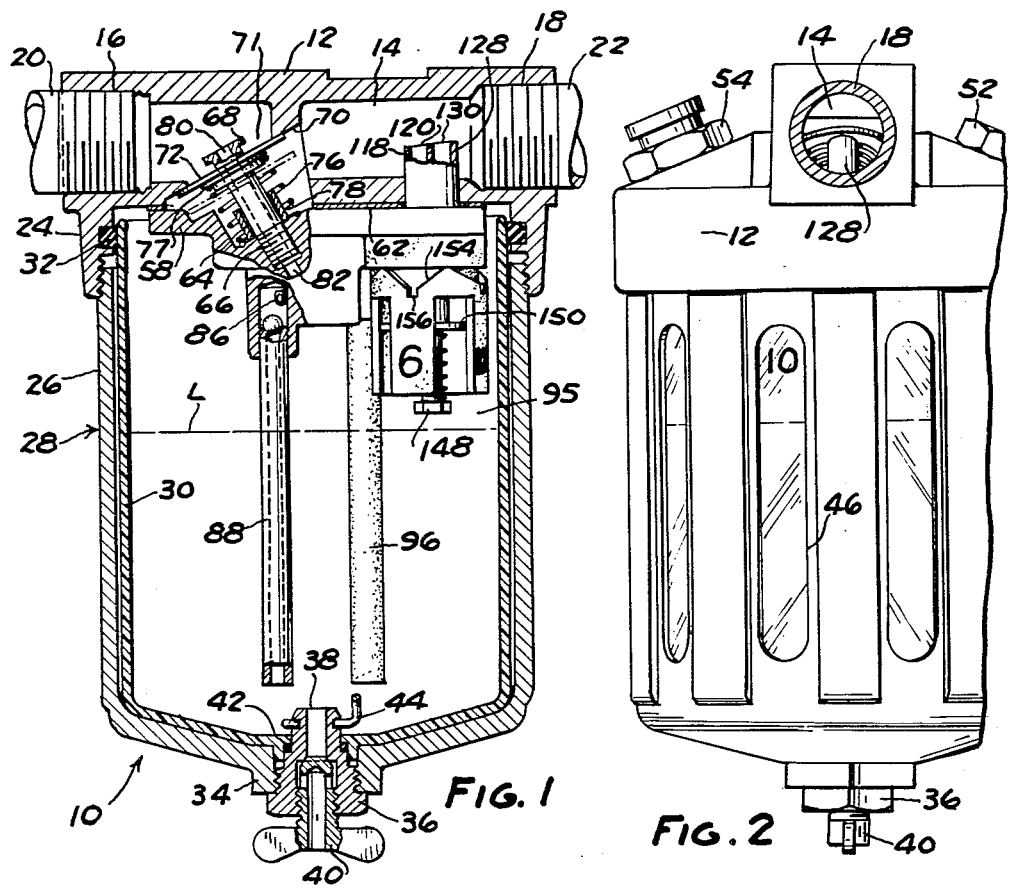
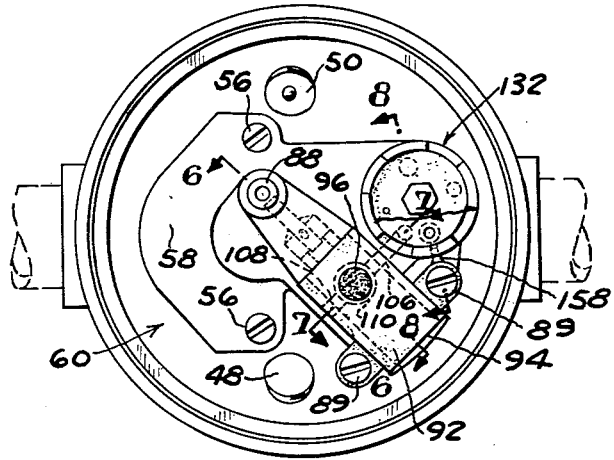
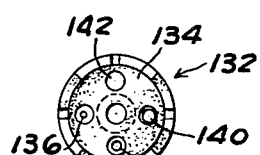
INVENTORS
QUIN R. GLEASON
& KEITH A. BOYD
BY
Barnes, Kisselle, Raisch & Choate
ATTORNEYS May 5, 1964     Q. R. GLEASON ETAL     3,131,786
AIR LINE LUBRICATOR Filed April 30, 1962     2 Sheets—Sheet 2

INVENTORS
QUIN R. GLEASON & KEITH A. BOYD
BY
Barnes, Kisselle, Raisch & Choate
ATTORNEYS

United States Patent Office 3,131,786
Patented May 5, 1964

3,131,786
AIR LINE LUBRICATOR
Quin R. Gleason and Keith A. Boyd, Detroit, Mich., assignors to Master Pneumatic, Inc., Detroit, Mich., a corporation of Michigan
Filed Apr. 30, 1962, Ser. No. 193,646
19 Claims. (Cl. 184—55)

This invention relates to a lubricator of the type which is connected into an air line for introducing lubricant into a flow of air which operates pneumatic equipment of various types. Lubricators of this type fall into three general categories: fog generators, wick feed lubricators, and drip type lubricators.

The fog generators utilize the air flow to generate a mist or fog which is introduced into the main air flow. These lubricators are very sensitive to the rate of air flow in the system. One inherent disadvantage is that at high rates of flow the fog generator provides lubricant at an excessive rate with the result that the equipment being operated becomes objectionably oily. On the other hand, the fog generator has a serious disadvantage in that at low rates of flow it may generate no fog at all. It may also fail to function where unusually viscous lubricant is being used.

The wick feed generator utilizes a wick of sintered metal or the like dipped into the lubricant bowl, and oil is stripped from an upper portion of the wick which projects into a Venturi, or equivalent constricted passageway, for introduction into the air line. A disadvantage of this type of lubricator is that the lubricant delivery rate varies with the level of lubricant in the cup. This type of lubricator is also sensitive to the rate of air flow in the system but somewhat less sensitive than the fog generator.

The drip type lubricator uses air line pressure to force oil from the lubricant bowl upwardly through a metered tube from where it drips back into the air stream. This type of lubricator is also sensitive to the rate of air flow in the system and the lubricant delivery rate varies with the level of lubricant in the cup. This type lubricator usually requires the use of a needle valve and sometimes other adjustments to control the dripping rate of the lubricant. The needle valve or other restriction is prone to clogging which interferes with lubricant delivery. The needle valve and other adjustments are difficult to correlate for providing lubricant as desired.

In general, it is a common disadvantage of all three types of lubricators that it is impossible to know with any reasonable degree of accuracy what the lubricant delivery rate is at any given time. To guard against the danger of inadequate lubricating, the user almost invariably adjusts the lubricator to provide an excess of lubricant which creates objectionable conditions in and around the equipment being operated by the lubricant-bearing air.

The object of this invention is to provide a relatively simple, in expensive air line lubricator improved to deliver lubricant to an air line at a predetermined rate which remains uniform despite variations of the rate of air flow in the air line between a very low rate of flow and a relatively high rate and despite variations in the lubricant level in the cup and despite variations in the pressure in the system.

Generally, the invention contemplates the use of a valve in the main passageway of the lubricator which is biased to closed condition to divert the entire flow of air through a bypass at low rates of flow. The bypass air aspirates oil from the reservoir against a wick which is isolated from the main passageway. Thereafter, the bypass air flows through a constriction around an immediately adjacent portion of the wick, strips oil from the wick, and delivers it to the main passageway.

The valve opens responsive to increased air flow to pass air directly through the main passageway and the bypass air flow and oil delivery rate remain substantially uniform. The bypass opens at its downstream end into the main passageway through a tube having an angled end to act as a scoop for retarding bypass air flow at relatively high rates of flow in the system, and this further aids in maintaining a uniform oil delivery rate. One form of the invention is shown in the accompanying drawings.

Figure 6:
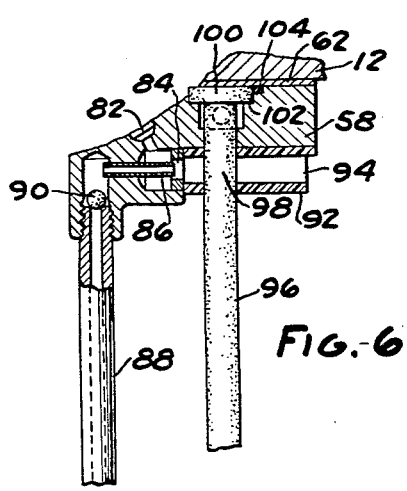
Figure 7:
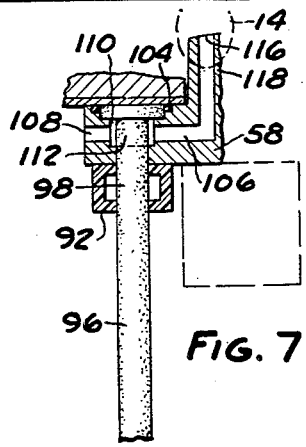
Figure 8:
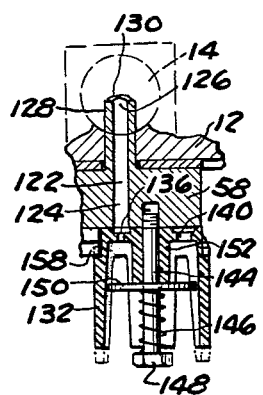

FIG. 1 is generally a vertical section through a lubricator according to this invention.
FIG. 2 is a fragmentary generally side elevational view of the lubricator.
FIG. 3 is a bottom plan view of the lubricator with the oil cup removed.
FIG. 4 is a top plan view of an adjustable metering device.
FIG. 5 is a diagrammatic sectional view of the lubricator illustrating it in operation.
FIG. 6 is a fragmentary sectional view on line 6—6 of FIG. 3.
FIG. 7 is a fragmentary sectional view on line 7—7 of FIG. 3.
FIG. 8 is a fragmentary sectional view on line 8—8 of FIG. 3.

Shown in the drawings is a lubricator 10 according to this invention having a head 12 with a passageway 14 having end portions 16 and 18 threaded for connection with conduits 20 and 22 in an air line system. The head has a depending ring 24 threaded onto the outer member 26 of a composite lubricant cup 28 whose inner member 30 is sealed to head 12 by an O-ring 32. The outer cup has a bottom boss 34 into which is threaded a fitting 36 having a drain opening 38 closed by a petcock 40. Inner cup 30 is sealed to the fitting by an O-ring 42. The cup members are detachably secured in assembled relation by a removable spring clip 44. Outer cup 28 has vertically elongate sight openings 46. The cup structure described is the subject of copending application Serial No. 191,014 filed April 30, 1962, and entitled "Cup Structure for Air Line Lubricators or the Like." Head 12 has filling openings 48 and 50 closed respectively by a threaded plug 52 and a threaded pressure fill fitting 54.

Secured to the underside of head 12 by screws 56 (FIG. 3) is a base 58 for a subassembly 60 of a number of parts to be described. A gasket 62 is interposed between the head proper and base 58.

A hollow stud 64 is threaded into a socket in base 58 as at 66 and the free end 68 of the stud projects centrally through a valve seat 70 formed in passageway 14 and defining a valve opening 71. A valve plate 72 in the form of a relatively thin washer has a central opening 74 slidably engaged around stud 64. The valve plate is biased toward seat 70 by a compressed coil spring 76 which seats on base 58 and engages a backup plate 77 slidably surrounding the stud. Plate 77 supports the valve plate against the tendency to cock and seize against the stud. A sleeve 78 around the stud provides a stop which limits opening movement of valve plate 72 before spring 76 is compacted to solid condition for protecting the spring against abuse. Valve plate 72 is angled at about 30° to the general direction of passageway 14 for a purpose to be described. The effective area of valve opening 71 around stud 64 is about the same as sectional area of passageway 14.

The hollow stud provides a passageway 80 opening into passageway 14 upstream of the valve. Passageway 80 has a continuation 82 formed in base 58 and terminating at an orifice 84 adjacent an aspirator tube 86 which communicates with a riser tube 88 supported by base 58 and projecting downwardly into cup 28 below the normal level L of lubricant. Preferably, a ball check 90 is provided adjacent the upper end of riser tube 88.

The aspirator discharges into a shroud 92 secured to base 58 by screws 89 and having a downstream portion 94 which opens into the interior 95 of cup 28. A sintered metal wick 96 has a portion 98 aligned with aspirator orifice 84 and has an upper head portion 100 supported by a shoulder 102 in base 58. The wick is isolated from the flow of air in passageway 14 by gasket 62 and an O-ring 104 provided around head 100.

Base 58 is provided with a passageway 106 whose upstream end 108 is open to the bowl interior and which has a portion forming a constricted passage 110 around a portion 112 of wick 96 relatively closely adjacent wick portion 98. Downstream of constriction 110, passageway 106 communicates into passageway 14 through the end 116 of a tube 118 which projects into the passageway. The upper end face 120 of the tube is disposed at a slight acute angle, preferably about 5°, to the direction of air flow through passageway 14.

Base 58 is also provided with a passageway 122 whose upstream end 124 opens to the bowl interior and whose downstream end 126 opens into passageway 14 through the end of a tube 128 adjacent tube 118. The upper end face 130 of tube 128 is inclined similarly to the upper end of tube 118.

An adjustable metering device 132 is provided adjacent the upstream end 124 of passageway 122. This device comprises a hollow knob having a closed top 134 provided with several ports 136, 138, 140, and 142 of different diameters. The knob is rotatably supported by a screw 144 threaded into base 58 (FIG. 8) through a coil spring 146 compressed against the screw head 148 and reacting upwardly against a washer 150 axially engaged against a central depending hub portion 152 of the knob.

The knob is provided adjacent its upper end with a circumferential arrangement of V-notches 154 terminating in detent sockets 156, one for each of the ports 136—142. A stationary detent member is provided on head 58, and for this purpose, shroud 92 is shown as being provided with a lug 158 projecting to a position for engaging the notches and sockets. Exterior portions of the knob are shown as being provided with numerals (FIG. 1) which are related to the size of the port registered with passageway 122. For example, when port 136 is in registry, the numeral 10 is visible through the transparent side of cup 30 and a sight opening 46 (FIG. 2).

In use, it may be assumed that the lubricator has been coupled to conduits 20 and 22 in the manner described. When there is only a low rate of flow of air through the conduits, spring 76 will hold valve washer 72 seated against valve 70 so that all of the air flow is diverted through passageway 80 in stud 64. The air flow through orifice 84 at a relatively high velocity, and lubricant is aspirated through riser tube 88 and aspirator tube 86. The oil droplets are blown from orifice 84 directly against wick portion 98 within shroud 92.

The oil feeds upwardly to adjacent wick portion 112 by capillarity. The rate of oil delivery to wick portion 98 exceeds the capillarity feed rate. Some of the excess oil accumulates on the interior of shroud 92 from where it drips back into the cup proper through shroud opening 94. Also, some of the oil may be carried against the interior of cup 30 by the air stream where it accumulates and returns to the oil reservoir.

After the air stream emerges from shroud 92, it divides into two paths, one being defined generally by passageway 106 in base 58 and the other of which is generally provided by passageway 122. Air enters passageway 106 through its upstream end 108 and flows at high velocity through constricted portion 110 around wick portion 112. The high velocity air strips oil off of wick portion 112, and the air flow in passageway 106 propels the oil through tube 118 and into main passageway 14 through opening 116. The other portion of the air emerging from shroud 92 passes upwardly into passageway 122 through a metering port in knob 132 and returns to main passageway 14 through the open end 126 of tube 128.

Upon increased rate of flow of air in the system, valve washer 72 is forced away from seat 70 against the action of spring 76 to pass air directly from inlet 20 to outlet 22 through main passageway 14. The rate of flow through the bypass from passageway 20 to outlet openings 116, 126 remains substantially constant. Consequently, the amount of oil stripped from wick portion 112 and delivered through passageway 106 to the main air stream also remains substantially constant. When the rate of flow diminishes, spring 76 returns the valve plate to closed engagement against seat 70 so that the entire air flow is again diverted through the bypass. In general, valve plate 72 will back away from seat 70 a distance generally proportional to the rate of air flow in the system within the limit provided by sleeve 78 which protects spring 76 from being compacted to solid condition.

At low rates of flows through the lubricator, the pressure loss created by valve 72 is relatively high while the pressure loss created by friction is relatively low. Upon increased rates of flow, the pressure loss created by the valve diminishes while the pressure loss created by friction increases. In this regard, it should be noted that the angular orientation of valve plate 72 results in a relatively small deflection of air flowing directly through passageway 14 from inlet 16 to outlet 18. This keeps turbulence and pressure loss to a minimum.

When the rate of flow through the lubricator is increased from about 2 standard c.f.m. to about 60 standard c.f.m. in a typical lubricator according to this invention, pressure loss increases from about 1½ p.s.i. to somewhat less than 2 p.s.i. in a system operating at 80 p.s.i. gauge pressure.

To compensate for this variation in pressure loss, the end faces of tubes 118 and 128 are angled in a direction upstream of the direction of air flow in passageway 14 as described. The angled open ends of the tubes thus act as scoops tending to divert air from passageway 14 into the downstream ends of tubes 118 and 128. This tends to impede the flow of air through the bypass and to diminish the rate of lubricant delivery into the main air stream. The end result is that even at elevated rates of air flow, the rate of lubricant delivery remains substantially constant.

Generally speaking, the rate of oil delivery remains substantially uniform at standard flow rates of from about 2 c.f.m. to about 60 c.f.m. in systems operating under gauge pressures of from about 5 p.s.i. to about 150 p.s.i. regardless of whether the level L of lubricant in bowl 28 is high or low.

The rate at which oil will be delivered to passageway 14 can be varied by turning knob 132 to register different sizes of metering orifices with the upstream end 124 of passageway 122. The size of the selected metering orifice determines the proportion of the bypass air which will pass through constriction 110 around wick portion 112. By selecting a relatively small orifice 136 as in FIG. 8, the lubricant delivery rate will be relatively high; by selecting a larger orifice 140 as in FIG. 5, the lubricant delivery rate will be lower. However, having selected a particular metering orifice, the delivery rate will remain constant over a relatively wide range of flow rates through conduits 20, 22 and a relatively wide range of pressures as brought out above.

This enables an operator to set the lubricator to deliver lubricant into an air line system at a uniform known rate which will be adequate to meet his requirements but which will not be excessive.

Passageway 122 and the metering orifice registered with it may be regarded as a bleed for air in the bypass which is in excess of the air required to operate the lubricant delivery system at a predetermined rate.

During short interval intermittent flow of air in the system, as when a piece of pneumatic equipment is being intermittently operated, air may not flow through the lubricator for long enough a time during each cycle to draw oil up through riser tube 88. Ball check 90 is provided for maintaining a column of lubricant in the riser tube so that even upon short intervals of air flow, lubricant will be aspirated against wick 96.

Washer 150 within metering port knob 132 extends radially into axial alignment with metering ports 136—142. Thus, washer 150 acts as a baffle which keeps the interior of cup 30 relatively quiescent and prevents violent agitation of the lubricant in the event of intermittent air flow through the system.

Any foreign matter or impurities such as water traveling through the pneumatic system tend to travel along the walls of conduits 20, 22. Since stud 64 projects centrally through valve seat 70, very little of this matter can enter the lubricator 80. It has been found that about 99 percent of such foreign material will pass directly through passageway 14 rather than entering the bypass.

Wick 96 is shown as extending downwardly below the normal level L of lubricant in the cup, but under normal circumstances, this is unnecessary. This measure is provided only as a safety measure should the aspirator fail to function for some reason. If this should happen, oil will still be fed to wick portion 112 by capillarity and will be transferred from there to the main air flow through passageway 106.

We claim:

1. An air line lubricator comprising,
    means defining a passageway adapted to be connected into a conduit for air under pressure,
    means defining a bypass connecting into said passageway at relative upstream and downstream locations,
    wick means isolated from the flow of air in said passageway having first and second portions disposed respectively in relative upstream and downstream portions of said bypass,
    a lubricant container, lubricant-delivery means communicating with said container and with said relative upstream portion of said bypass,
    said lubricant delivery means operable responsive to air flow in said bypass to deliver lubricant from said lubricant container to said first wick portion at a rate exceeding the capillarity delivery rate between said wick portions,
    said relative downstream portion of said bypass forming a constriction around said second wick portion through which air flows at a relatively high velocity for removing lubricant from said wick portion and passing it into said passageway at said downstream location.

2. The combination defined in claim 1 wherein said delivery means includes an aspirator from which lubricant is directed against said first wick portion by air flowing in said bypass, said bypass adjacent said first wick portion being formed in part by the container interior so that excess lubricant can return to its source.

3. The combination defined in claim 2 wherein said bypass includes means providing a shroud around said first wick portion into which said aspirator delivers lubricant, said shroud being open to the container interior so that lubricant collecting therein can return to its source.

4. The combination defined in claim 3 wherein said bypass includes successively an orifice of said aspirator, said shroud, a portion of said container interior, and said constriction around said second wick portion.

5. The combination defined in claim 3 wherein said shroud and constriction are separated by apertured wall means through which said wick projects.

6. An air line lubricator comprising,
    means defining a passageway adapted to be connected into a conduit for air under pressure,
    means defining a bypass connecting into said passageway at relative upstream and downstream locations,
    a lubricant container, lubricant-delivery means communicating with said container and with said bypass,
    said lubricant delivery means operable responsive to air flow in said bypass to deliver lubricant from said lubricant container into said bypass,
    said air flow in said bypass being operable to deliver to said downstream location lubricant received from said lubricant container,
    said bypass having a terminal opening into said passageway at said downstream location,
    said opening being inclined in a direction upstream of the flow of air in said passageway so that said opening provides an air scoop operable to resist lubricant delivering flow of air through said opening.

7. The combination defined in claim 6 wherein said bypass has a downstream terminal portion in the form of a tube which projects into said passageway, the end of said tube being inclined in said direction and providing said inclined opening.

8. The combination defined in claim 6 wherein the angle of inclination of said opening is about 5°.

9. The combination defined in claim 6 wherein a valve is provided in said passageway between said upstream and downstream locations,
    said valve being biased to closed condition with sufficient force so that said valve is operable to obstruct flow of air through said passageway at a relatively low rate,
    said valve being operable responsive to increased rate of air flow to pass air through said passageway.

10. The combination defined in claim 6 and including in addition means dividing a downstream portion of said bypass into two paths of air flow, one of which terminates at said opening and the other of which provides a bleed for air in excess of that required to deliver lubricant received from said container to said opening, said other path having a downstream terminal opening into said passageway which is also inclined in a direction upstream of the flow of air in said passageway.

11. The combination defined in claim 10 wherein the angles of inclination of said openings are substantially equal.

12. The combination defined in claim 10 wherein said openings are immediately adjacent.

13. The combination defined in claim 10 wherein said terminal openings are provided by two tubes side by side, the end faces of which are inclined at an acute angle to the direction of air flowing in said passageway and in a direction upstream thereof.

14. An air line lubricator comprising,
    means defining a passageway adapted to be connected into a conduit for air under pressure,
    means defining a bypass connected into said passageway at relative upstream and downstream locations,
    said bypass including means providing two paths of air flow, one of which terminates at an opening at said downstream location through which lubricant is introduced into said passageway,
    a lubricant container, lubricant-delivery means communicating with said container and with said one path,
    said lubricant delivery means operable responsive to air flow in said bypass to deliver lubricant from said lubricant container to said one path for delivery through said opening,
    said other path of air flow providing a bleed for air in excess of that required to actuate said lubricant-delivery means, said other path having a terminal opening into said passageway generally adjacent said downstream location,
    a member having a plurality of ports of different sizes, said member being mounted so that said ports are selectively registrable with a portion of said other path of air flow, whereby selectively to proportion the rates of flow in said paths and regulate the quantity of lubricant delivered through said one path.

15. The combination defined in claim 14 wherein a portion of said second path includes the interior of said container and a tube extending therefrom to the downstream terminal opening of said second path, said member being disposed so that said ports are selectively registrable with the upstream end of said tube.

16. The combination defined in claim 15 wherein a baffle is interposed between the ported end of said tube and the container interior, whereby to maintain a generally quiescent condition within said container despite intermittent flow of air in said passageway.

17. An air line lubricator comprising, a head having a passageway adapted to be connected into a conduit for air under pressure,
- a lubricant-containing cup secured to said head, said head having openings intercommunicating the interior of said cup with said passageway at relative upstream and downstream locations to provide a bypass,
- a valve in said passageway between said locations biased to closed condition with sufficient force to divert substantially all of the air at a relatively low rate of flow through said bypass,
- said valve being openable against said closing bias responsive to increased air flow to pass air through said passageway, whereby to minimize the influence of the increased air flow on the rate of flow through said bypass,
- a wick mounted on said head and being isolated from the flow of air in said passageway,
- said wick having first and second portions,
- said bypass including a portion into which said first wick portion projects,
- delivery means operable responsive to air flow in said bypass to deliver lubricant to said first wick portion at a rate exceeding the capillarity delivery rate between said portions,
- said bypass downstream of said portion thereof being divided into two paths, one of which includes a constricted region around said second wick portion through which air flows at a relatively high velocity for removing lubricant from said second wick portion,
- said one path also including a duct downstream of said constricted region which has a terminal opening into said passageway generally at said downstream location through which lubricant is introduced into said passageway,
- the other path of air flow providing a bleed for air in excess of that required in said one path, said other path also having a downstream terminal opening into said passageway generally adjacent said downstream location.

18. The combination defined in claim 17 wherein said downstream terminal openings of said paths of flow are angled in a direction upstream of the flow of air through said passageway, whereby to retard increased air flow through said bypass upon increased air flow through said passageway.

19. The combination defined in claim 17 and including in addition a ported member movably mounted within said container for selectively registering ports of different sizes therein with one of said paths of flow, whereby to proportion the relative air flow in said paths and regulate the lubricant delivery rate into said passageway.

References Cited in the file of this patent
UNITED STATES PATENTS

| | | |
|---|---|---|
| 1,206,520 | Eglinton | Nov. 28, 1916 |
| 2,835,267 | Andresen et al. | May 20, 1958 |
| 2,878,895 | Wiley | Mar. 24, 1959 |